United States Patent
Griffin et al.

(10) Patent No.: US 11,973,682 B2
(45) Date of Patent: Apr. 30, 2024

(54) DYNAMIC MESH MAPPING SERVICE

(71) Applicant: Red Hat, Inc., Raleigh, NC (US)

(72) Inventors: Leigh Griffin, Waterford (IE); Cathal O'Connor, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 144 days.

(21) Appl. No.: 17/676,714

(22) Filed: Feb. 21, 2022

(65) Prior Publication Data
US 2023/0269166 A1  Aug. 24, 2023

(51) Int. Cl.
| H04L 45/021 | (2022.01) |
| H04L 45/00 | (2022.01) |
| H04L 45/28 | (2022.01) |
| H04L 45/42 | (2022.01) |

(52) U.S. Cl.
CPC ............ *H04L 45/021* (2013.01); *H04L 45/20* (2013.01); *H04L 45/28* (2013.01); *H04L 45/42* (2013.01)

(58) Field of Classification Search
CPC ....... H04L 45/021; H04L 45/20; H04L 45/28; H04L 45/42
See application file for complete search history.

(56) References Cited

U.S. PATENT DOCUMENTS

| 6,628,620 | B1 * | 9/2003 | Cain | ....................... H04L 45/28 455/449 |
| 8,467,297 | B2 | 6/2013 | Liu et al. | |
| 8,532,020 | B2 * | 9/2013 | Aust | ...................... H04W 76/14 370/328 |
| 9,170,971 | B2 * | 10/2015 | Goss | ........................ H04L 45/02 |
| 9,252,901 | B2 * | 2/2016 | Lee | ...................... H04W 56/002 |
| 9,407,507 | B2 | 8/2016 | Ho et al. | |
| 9,596,169 | B2 | 3/2017 | Choudhury et al. | |
| 9,634,928 | B2 | 4/2017 | Choudhury et al. | |
| 9,723,464 | B2 | 8/2017 | Patil et al. | |
| 9,955,284 | B2 * | 4/2018 | Moon | .................... H04W 8/005 |
| 10,045,197 | B1 * | 8/2018 | Abdallah | ................ H04L 45/24 |

(Continued)

OTHER PUBLICATIONS

Quan, Yongyun, "Topology-based Device Self-identification in Wireless Mesh Networks," Aug. 30, 2019, KTH Royal Institute of Technology, Stockholm, Sweden, https://www.diva-portal.org/smash/get/diva2:1356658/FULLTEXT01.pdf.

(Continued)

*Primary Examiner* — George C Neurauter, Jr.
(74) *Attorney, Agent, or Firm* — Womble Bond Dickinson (US) LLP (57) ABSTRACT

A system and method of dynamically mapping a network topology of a mesh network of nodes. The method including maintaining, by a processing device of a control node of the mesh network, a network topology map indicating groups of neighboring nodes. The method including determining that a first node of the mesh network discovered a neighbor change event associated with a second node. The method including identifying, based on the network topology map, a group of neighboring nodes of a target node of the mesh network responsive to determining that the first node detected the neighbor change event. The method including transmitting a targeted message to a first neighboring node of the group of neighboring nodes to cause the first neighboring node to notify the group of neighboring nodes of the neighbor change event.

20 Claims, 5 Drawing Sheets

(56) References Cited

U.S. PATENT DOCUMENTS

| | | | | |
|---|---|---|---|---|
| 10,542,412 B2* | 1/2020 | Abdallah | ............ | H04B 7/0617 |
| 10,887,752 B2* | 1/2021 | Abdallah | ............... | H04B 7/086 |
| 11,153,420 B2* | 10/2021 | Ranpise | ................. | H04L 45/42 |
| 11,178,599 B2* | 11/2021 | Abouelseoud | ...... | H04W 40/244 |
| 2011/0103264 A1* | 5/2011 | Wentink | ............... | H04W 8/005 |
| | | | | 370/255 |
| 2013/0331097 A1* | 12/2013 | Kang | ................... | H04W 48/16 |
| | | | | 455/434 |
| 2018/0013658 A1* | 1/2018 | Wiesmaier | ............. | H04L 45/02 |

OTHER PUBLICATIONS

Cilfone, Antonio, et al., "Wireless Mesh Networking: An IoT-Oriented Perspective Survey on Relevant Technologies," Apr. 17, 2019, Internet of Things (IoT) Lab, Department of Engineering and Architecture, University of Parma, Italy, https://www.researchgate.net/publication/332485316_Wireless_Mesh_Networking_An_IoT-Oriented_Perspective_Survey_on_Relevant_Technologies.

* cited by examiner

DYNAMIC MESH MAPPING SERVICE

TECHNICAL FIELD

The present disclosure relates generally to software technology, and more particularly, to systems and methods of dynamically mapping a network topology of a mesh network of nodes.

BACKGROUND

A mesh network is a network in which devices—or nodes—are linked together, branching off other devices or nodes. These networks are set up to efficiently route data between devices and clients. They help organizations provide a consistent connection throughout a physical space.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Internet of Things (IoT) devices, such as mesh device, have numerous ways to discover their location and that of their neighbors through the usage of various network protocols and sensors. However, with IoT devices potentially free moving, for example, in automobiles, an understanding of the current location and the neighbors can be a challenge to overcome in order to allow for more targeted geolocation and neighbor aware location actions. Furthermore, when a neighbor change occurs at a local level, the devices may discover this and typically propagate the neighbor change out to nearby neighbors, which in turn, cascades through the mesh network from device to device. This can be costly and noisy on the mesh network because it increases network congestion and consumes excess networking resources. For this reason, in the cases of several protocols, the message delivery will not commence until the network topology is known from a routing perspective. Yet, the cost of finding out that information in a resource constrained mesh network can be overly burdensome on the mesh network.

Aspects of the present disclosure address the above-noted and other deficiencies by dynamically mapping a network topology of a mesh network of nodes. As discussed in greater detail below, a control mesh node of a mesh network executes a dynamic mesh mapping service (DMMS) agent that generates, and maintains in a storage (e.g., database, memory), a network topology map of the mesh network to show where neighboring nodes are located at any given point in time. When a mesh node detects a neighbor change event (e.g., a new neighbor, a loss of a neighbor, etc.), it contacts the DMMS agent of the control mesh node with the details about the neighbor change event. To save bandwidth, the DMMS updates (e.g., redraws) the network topology map to target just the changed neighbors in a controlled manner (which may trigger, for example, on demand), rather than forcing the neighbors to propagate the messages, endlessly throughout the mesh network. This process can be reactive or proactive by the DMMS agent to force an update to just those neighbors changed.

For cases where propagation is not possible (e.g. security reasons to not respond to certain devices publicly) or where there is too much free movement to make propagation worthwhile (e.g. automobiles moving in a parking lot), the DMMS agent may draw a dynamic snapshot of the network based on responses it receives from the mesh nodes and based on what neighbors that they identify. The DMMS agent can then infer neighbors for "hidden" devices that do not respond to other mesh nodes by mapping the network edges based on mesh nodes that can respond. This can help to prime the mesh network for more intelligent geolocation oriented actions. The DMMS agent also allows for dynamic message routing, where an administrator of the mesh network can specify a destination and the DMMS agent will return a snapshot of the network topology map to route accordingly. An embodiment of this is the creation of sub meshes, with the ability to form a bounded variant based on free movement into geographic catchment areas (e.g., geofencing) which could be useful from a software update perspective.

Figure 1:
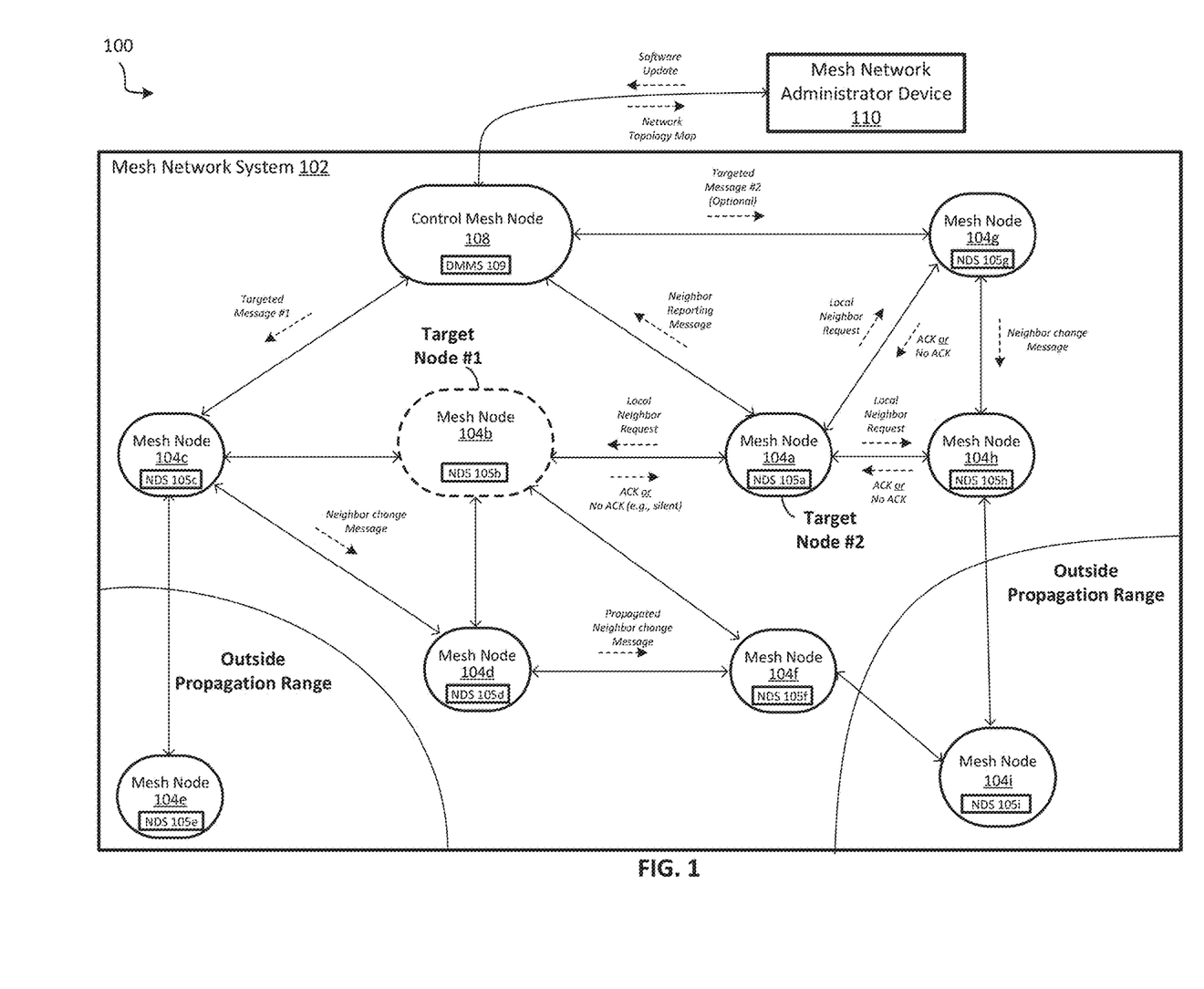
FIG. 1 is a block diagram depicting an example environment for dynamically mapping a network topology of a mesh network of nodes, according to some embodiments.

FIG. 1 is a block diagram depicting an example environment for dynamically mapping a network topology of a mesh network of nodes, according to some embodiments. The environment 100 includes a mesh network system 102 (sometimes referred to as, "mesh network") a mesh network system 112, and a mesh network administrator device 110. The mesh network system 102 includes mesh nodes 104 (e.g., mesh nodes 104a, 104b, 104c, 104d, 104e, 104f, 104g, 104h, 104i). The mesh network system 102 includes a control mesh node 108 (sometimes referred to as, "control node"), which is a mesh node 104 that is further configured with additional "administrative" functionality for controlling and/or managing the other mesh nodes 104 in the mesh network system 102. The control mesh node 108 is communicably coupled to the mesh network administrator device 110 via an external network (not shown in FIG. 1).

Each of the mesh nodes 104 execute a neighbor discovery service (NDS) agent 105. Specifically, the mesh node 104a executes an NDS agent 105a, the mesh node 104b executes an NDS agent 105b, the mesh node 104c executes an NDS agent 105c, the mesh node 104d executes an NDS agent 105d, the mesh node 104e executes an NDS agent 105e, the mesh node 104f executes an NDS agent 105f, the mesh node 104g executes an NDS agent 105g, the mesh node 104h executes an NDS agent 105h, and the mesh node 104i executes an NDS agent 105i.

The NDS agent 105 is configured to detect (e.g., discover) neighbor change events associated with its neighboring mesh nodes 104. The NDS agent 105 of a mesh node 104 (e.g., mesh node 104a) then sends a message (shown in FIG. 1 as, "neighbor reporting message") to the control mesh node 108, where the message indicates the neighbor change event. The neighbor reporting message includes the mesh node's identifier (ID), any neighboring mesh node IDs, any security policies associated with the mesh node 104, any security policies associated with the neighboring mesh node IDs, a device type ID (e.g., insulin pump, smartphone, smartwatch, etc.) of the mesh node 104, and device type IDs of the neighboring mesh nodes.

Each mesh node (e.g., mesh node 104a, control mesh node 108, etc.) of a mesh network system (e.g., mesh network system 102, mesh network system 112) is positioned (e.g., arranged, organized) within the mesh network system, such that the mesh node may be within a minimum physical distance (e.g., up to 10 meters with a Bluetooth connection, up to 46 meters with a wireless local area network (WLAN) connection) of neighboring mesh nodes to be able to communicate with its neighboring nodes by using one or more types of communication capabilities.

As shown in FIG. 1, the mesh node 104a has neighboring mesh nodes that include control mesh node 108 and mesh nodes 104b, 104g, 104h when using a first type of communication capability (e.g., a Bluetooth, etc.). The mesh node 104b has neighboring mesh nodes that include mesh nodes 104a, 104c, 104d, 104f when using the first type of communication capability. The mesh node 104c has neighboring mesh nodes that include mesh nodes 104b, 104d, 104e and control mesh node 108 when using the first type of communication capability. The mesh node 104d has neighboring mesh nodes that include mesh nodes 104b, 104c, 104f when using the first type of communication capability. The mesh node 104e has neighboring mesh nodes that include mesh node 104c when using the first type of communication capability. The mesh node 104f has neighboring mesh nodes that include mesh nodes 104d, 104i when using the first type of communication capability. The mesh node 104g has neighboring mesh nodes that include control mesh node 108 and mesh nodes 104a, 104h when using the first type of communication capability. The mesh node 104h has neighboring mesh nodes that include mesh nodes 104a, 104g, 104i when using the first type of communication capability. The mesh node 104i has neighboring mesh nodes that include mesh nodes 104f, 104h when using the first type of communication capability.

A mesh node (e.g., mesh node 104a, control mesh node 108, etc.) may have a greater number of neighboring mesh nodes when using a second type of communication capability (e.g., a WLAN connection). For example, the mesh node 104a may expand its neighboring mesh nodes to also include mesh node 104f when using the second type of communication capability. The mesh node 104b may expand its neighboring mesh nodes to also include mesh node 104e, 104i when using the second type of communication capability. The mesh node 104d may expand its neighboring mesh nodes to also include mesh node 104e when using the second type of communication capability. The mesh node 104e may expand its neighboring mesh nodes to also include mesh node 104d when using the second type of communication capability. The mesh node 104f may expand its neighboring mesh nodes to also include mesh nodes 104a, 104b, 104h when using the second type of communication capability. The mesh node 104h may expand its neighboring mesh nodes to also include mesh node 104f when using the second type of communication capability. The mesh node 104i may expand its neighboring mesh nodes to also include mesh node 104a when using the second type of communication capability.

A mesh node (e.g., mesh node 104a, control mesh node 108, etc.) may directly communicate with its neighboring mesh nodes 104 by using one or more types of communication capabilities. A communication capability may include the hardware and/or software resources for communicating via a Bluetooth (BT) connection, a WLAN connection, and/or a near field communication (NFC) connection. In some embodiments, a mesh node 104 includes the hardware and/or software resources for communicating via a cellular network (e.g., LTE, 5G, etc.), which allow the mesh node 104 to communicate with computing devices outside of the mesh network system 102. In some embodiments, a mesh mode 104 does not include the hardware and/or software resources for communicating via a cellular network (e.g., LTE, 5G, etc.), which prevent the mesh node 104 from communicating with computing devices outside of the mesh network system 102.

In some embodiments, a mesh node (e.g., mesh node 104a, control mesh node 108, etc.) may be unable to directly communicate with a non-neighboring mesh node when using a particular communication capability because the non-neighboring node is outside of the radio frequency (RF) range of the particular communication capability. In some embodiments, a mesh node that is unable to directly communicate with a non-neighboring mesh node may indirectly communicate with the non-neighboring node by directly communicating through a neighboring mesh node. For example, if the control mesh node 108 wants to communicate with the mesh node 104d, then the control mesh node 108 may send a first message (shown in FIG. 1 as, "targeted message #1") to mesh node 104c to cause the mesh node 104c to send a second message (shown in FIG. 1 as, neighbor change message") to the mesh node 104d, where the second message indicates the details of the first message (e.g., target message #1). As another example, if the mesh node 104c wants to communicate with the mesh node 104f, then the mesh node 104c may send a first message (shown in FIG. 1 as, "neighbor change message") to mesh node 104d to cause the mesh node 104d to redirect (e.g., forward, propagate) the first message (shown in FIG. 1 as, "propagated neighbor change message") to the mesh node 104i.

A mesh node 104 may directly communicate with a group of its neighboring nodes using a first type of communication capability and another group of its neighboring nodes using a second type of communication capability. For example, the mesh node 104a may directly communicate with a first group (e.g., mesh node 104b, mesh node 104h) of its neighboring nodes using one or more Bluetooth connections and a second group (e.g., control mesh node 108, mesh node 104g) of its neighboring nodes using one or more WLAN connections.

A mesh node 104 may be configured to discover its neighboring mesh nodes 104 by broadcasting a ping message (shown in FIG. 1 as, local neighbor request") outward using a particular communication capability and identifying the mesh nodes 104 that responds to the ping message as its neighboring mesh nodes. For example, the mesh node 104a may transmit ping messages toward the mesh nodes 104b, 104g, 104h to cause each of the mesh nodes 104 to either respond with an acknowledgement (shown in FIG. 1 as, "ACK") or not respond (e.g., stay silent). In some embodiments, a mesh node 104 may be prohibited from responding to the local neighbor request due to a security policy that requires for the particular mesh node 104 to stay "hidden"

from other mesh nodes 104. In some embodiments, a mesh node 104 may be unable to respond to the local neighbor request because the mesh node 104 lacks the communication capability (e.g., faulty communication hardware, a mismatch in communication protocols, etc.) to respond. For example, the mesh node 104a might have broadcasted the local neighbor request using a Bluetooth channel, but the mesh node 104b only has the capability to communicate using a WLAN channel. Therefore, the mesh node 104b never received the Bluetooth message. In some embodiments, a mesh node 104 may be configured to discover a first groups of its neighboring mesh nodes when using a first type (e.g., Bluetooth) of communication capability, a second group of its neighboring mesh nodes when using a second type (e.g., WLAN) of communication capability, and so on.

An external network may be a public network (e.g., the internet), a private network (e.g., a local area network (LAN) or wide area network (WAN)), or a combination thereof. In some embodiments, an external network may include a wired or a wireless infrastructure, which may be provided by one or more wireless communications systems, such as wireless fidelity (Wi-Fi) connectivity to the external network and/or a wireless carrier system that can be implemented using various data processing equipment, communication towers (e.g. cell towers), etc. The external network may carry communications (e.g., data, message, packets, frames, etc.) between any other the computing device.

A mesh node 104, the control mesh node 108, and a mesh network administrator device 110 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may comprise a single machine or may include multiple interconnected machines (e.g., multiple servers configured in a cluster).

In some embodiments, the mesh node 104, the control mesh node 108, and the mesh network administrator device 110 may each be a wearable device (e.g., smartwatch, smart clothing, smart glasses, smart jewelry, wearable camera, wireless earbuds, fitness tracker, blood pressure monitor, heart rate monitor, etc.) or an implantable device (e.g., insulin pump, cochlear device, pacemaker, brain simulator, etc.).

Still referring to FIG. 1, the control mesh node 108 executes a dynamic mesh mapping service (DMMS) agent 109 that is configured to dynamically generate a network topology map (sometimes referred to as, "network snapshot") that indicates based on the responses it receives from mesh nodes 104 about their attempts to discover their neighboring nodes. The network topology map indicates the one or more groups of neighboring nodes of the mesh network system 102 at a given point in time. The DMMS agent 109 maintains the network topology map in a storage (e.g., a database, a memory, etc.) and uses the network topology map for propagation control of neighbor reporting messages throughout the mesh network system 102. As discussed in greater detail below, a first mesh node (e.g., mesh nodes 104a) discovers a neighbor change event that is associated with a second mesh node (e.g., mesh node 104b) that neighbors the first mesh node. For example, the first mesh node 104 may discover that the second mesh node 104 is a new neighbor, discover that the second mesh node 104 is no longer a neighbor, and/or discover an inability of the second mesh node 104 to respond to queries from the first mesh node 104. The first mesh node 104 then transmits a message (shown in FIG. 1 as, "neighbor reporting message") to the DMMS agent 109 to notify the DMMS agent 109 about its discovery of the neighbor change event.

Responsive to receiving the message, the DMMS agent 109 selects one of the mesh nodes 104 of the mesh network system 102 as the "target node." For example, the DMMS agent 109 may select the first mesh node (e.g., mesh node 104a) as the "target node" because it discovered the neighbor change event, or the second mesh node (e.g., mesh node 104b) as the "target node" because it triggered the neighbor change event. The DMMS agent 109 then identifies, based on the network topology map, a group of neighboring nodes of the target node that are unaware of the neighbor change event associated with the second mesh node (e.g., mesh node 104b). For example, if the DMMS agent 109 selects the mesh node 104b as the target node (shown in FIG. 1 as, "target node #1"), then the group of neighboring nodes that are unaware of the neighbor change event would include mesh node 104c, mesh node 104d, and/or mesh node 104f. As another example, if the DMMS agent 109 selects the mesh node 104a as the target node, then the group of neighboring nodes that are unaware of the neighbor change event would include mesh node 104b, mesh node 104g, and/or mesh node 104h.

The DMMS agent 109 then transmits a targeted message (e.g., not a broadcast message) to a single node of the neighboring nodes of the group of neighboring nodes to cause the single node to notify the group of neighboring nodes of the neighbor change event. As shown in FIG. 1, if the DMMS agent 109 selects the mesh node 104b as the target node, then the DMMS agent 109 transmits a targeted message (shown in FIG. 1 as, "targeted message #1") to mesh node 104c to cause the mesh node 104c to notify the other mesh nodes of the group of neighboring nodes about the neighbor change event. That is, the mesh node 104c transmits a message (shown in FIG. 1 as, "neighbor change message") to mesh node 104d, which causes the mesh node 104d to propagate the message (shown in FIG. 1 as, "propagated neighbor change message") to mesh node 104f. However, the mesh node 104f does not propagate the message to mesh node 104i because mesh node 104i is not a neighboring node of mesh node 104b, and thus is outside the propagation range for reporting neighbor change events when mesh node 104b is selected as the target node. Likewise, the mesh node 104c does not propagate the message to mesh node 104e because mesh node 104e is not a neighboring node of mesh node 104b, and thus is outside the propagation range for reporting neighbor change events when mesh node 104b is selected as the target node.

Alternatively, if the DMMS agent 109 selects the mesh node 104a as the target node, then the DMMS agent 109 transmits a targeted message (shown in FIG. 1 as, "targeted message #2") to mesh node 104g to cause the mesh node 104g to notify the other mesh nodes of the group of neighboring nodes about the neighbor change event. That is, the mesh node 104g transmits a message (shown in FIG. 1 as, "neighbor change message") to mesh node 104h, but does not propagate the message to mesh node 104i because mesh node 104i is not a neighboring node of mesh node 104a, and thus is outside the propagation range for reporting neighbor change events when mesh node 104a is selected as the target node.

The DMMS agent 109 can also dynamically generate a network topology map that indicates the presence of "hidden" mesh nodes 104 in the mesh network system 102, which are mesh nodes 104 that cannot be discovered by its neighboring nodes for reasons related to a security policy and/or lacking a communication capability (e.g., faulty hardware and/or software resources). That is, the mesh network system 102 may be distributed over a geographic region consisting of several overlapping or non-overlapping sub-regions, where each sub-region includes a group (e.g., a sub-mesh) of mesh nodes 104 that provide a service (e.g., networking, compute, storage, application, etc.) within the sub-region. The DMMS agent 109 may identify the group of nodes within a particular sub-region of the geographic region based on the network topology map. The DMMS agent 109 may then transmit a message to the group of nodes to cause each node of the group of nodes within the particular sub-region to broadcast a message (shown in FIG. 1 as, "local neighbor request") to discover their neighboring nodes. The neighboring nodes may either respond to the local neighbor request with an acknowledgement (shown in FIG. 1 as, "ACK") or not respond.

After discovering their neighbors, each of the mesh nodes 104 send a message (shown in FIG. 1 as, "neighbor reporting message") to the DMMS agent 109, where each message identifies each of the neighboring nodes of the mesh node 104 that replied to their local neighbor request. The DMMS agent 109 may then infer, based on the plurality of responses, an existence of a hidden node in the sub-region even though the hidden node did not reply to any of the local neighbor requests. The DMMS agent 109 may then redefine, based on the plurality of responses, the network edges of the sub-region to indicate the existence of the now-identified, hidden node.

An administrator of the mesh network system 102 may benefit from having access to a network topology map indicating all (including the hidden) of the mesh nodes 104 in the mesh network system 102 because the administrator may want to send a particular software update/patch to a particular group of mesh nodes 104. For example, the administrator may want to send a critical software update/patch to only the hidden mesh nodes in the mesh network system 102 because the hidden mesh nodes are associated with a particular (e.g., low-level, high-level) security policy that is different from security policy of the other mesh nodes 104. To do this, the administrator may send a request, via the mesh network administrator device 110, to the DMMS agent 109 for access to the network topology map indicating all the mesh node identifiers corresponding to the mesh nodes 104. The administrator may then send a message to the control mesh node 108, where the message includes the software update and a set of mesh node identifiers. The message causes the control mesh node 108 to send (e.g., push) the software update to each of the mesh nodes 104 corresponding to the set of mesh node identifiers.

Although FIG. 1 shows only a select number of computing devices (e.g., mesh nodes 104, control mesh node 108, and mesh network administrator device 110), the environment 100 may include any number of computing devices that are interconnected in any arrangement to facilitate the exchange of data between the computing devices.

Figure 2A:
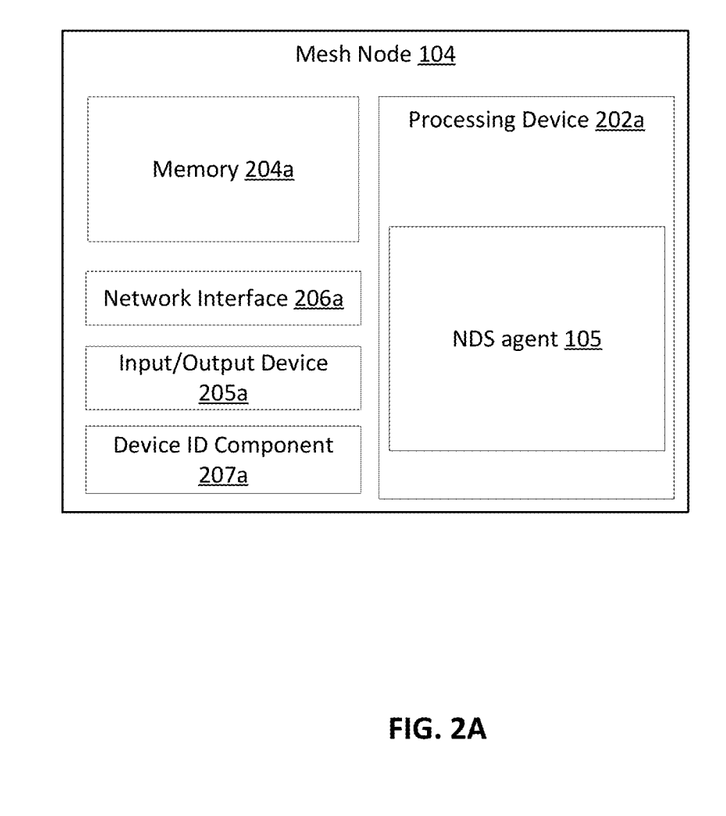
FIG. 2A is a block diagram depicting an example mesh node 104 of the mesh network system 102 in FIG. 1, according to some embodiments.

FIG. 2A is a block diagram depicting an example mesh node 104 of the mesh network system 102 in FIG. 1, according to some embodiments. While various devices, interfaces, and logic with particular functionality are shown, it should be understood that the one or more mesh nodes 104 (e.g., mesh nodes 104a-i) of the mesh network system 102 each include any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The mesh node 104 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the mesh node 104. In some embodiments, the processing device 202a and the memory 204a form various processing devices and/or circuits described with respect to the mesh node 104. The instructions include code from any suitable computer programming language such as, but not limited to, C, C++, C#, Java, JavaScript, VBScript, Perl, HTML, XML, Python, TCL, and Basic.

The processing device 202a may execute a neighbor discovery service (NDS) agent 105 that is configured to discover its neighboring mesh nodes by broadcasting a ping message (shown in FIG. 1 as, local neighbor request") outward using a particular communication capability and identifying the mesh nodes 104 that respond to the local neighbor request as its neighboring mesh nodes. In some embodiments, a neighboring mesh node may be prohibited from responding to the local neighbor request due to a security policy that requires the particular mesh node 104 to stay "hidden" from other mesh nodes 104. In some embodiments, a mesh node 104 may be unable to respond to the local neighbor request because the mesh node 104 lacks the communication capability (e.g., faulty communication hardware, a mismatch in communication protocols, etc.) to respond. In some embodiments, the NDS agent 105 may be configured to discover a first group of its neighboring mesh nodes when using a first type of communication capability (e.g., Bluetooth), a second group of its neighboring mesh nodes when using a second type of communication capability (e.g., NFC), and so on.

The NDS agent 105 may be configured to discover its neighboring mesh nodes 104 responsive to receiving a request from the control mesh node 108. For example, the NDS agent 105*a* of mesh node 104*a* may receive a request (sometimes referred to as, "a neighbor request") from the control mesh node 108, which causes the NDS agent 105*a* to broadcast a ping message (e.g., local neighbor request) to mesh nodes 104*b*, 104*h*, 104*g*. The mesh node 104 may then determine that the mesh nodes 104 that responded to the ping message are its neighboring mesh nodes. In some embodiments, the NDS agent 105 may be configured to periodically discover its neighboring mesh nodes 104 in order to keep their locally stored routing tables up-to-date.

The NDS agent 105 may be configured to discover a neighbor change event that is associated with one of its neighboring nodes. For example, NDS agent 105*a* of mesh node 104*a* may discover that mesh node 104*b* was previously not a neighboring node, but now is a neighboring node of mesh node 104*a*. As another example, NDS agent 105*a* of mesh node 104*a* may discover that mesh node 104*b* was previously a neighboring node, but now is not a neighboring node of mesh node 104*a*. As another example, NDS agent 105*a* of mesh node 104*a* may discover that mesh node 104*b* was previously a neighboring node that responded to ping message, but no longer is responding to ping messages. In this embodiment, the mesh node 104*b* may either still be a neighboring node of mesh node 104*a*, or no longer a neighboring node of mesh node 104*a*.

The NDS agent 105 of a mesh node 104 may be configured to transmit a message (shown in FIG. 1 as, "neighbor reporting message") to the control mesh node 108 to notify the control mesh node 108 about its discovery of the neighbor change event. The neighbor reporting message includes the mesh node's identifier (ID), any neighboring mesh node IDs, any security policies associated with the mesh node 104, any security policies associated with the neighboring mesh node IDs, a device type ID (e.g., insulin pump, smartphone, smartwatch, etc.) of the mesh node 104, and device type IDs of the neighboring mesh nodes. The mesh node ID is a unique value that the control mesh node 108 generates and assigns to each mesh node 104 in the mesh network system 102. The control mesh node 108 uses the mesh node ID to keep track of and communicate with each mesh node 104.

The NDS agent 105 of a first mesh node (e.g., mesh node 104*c*) may be configured to receive a targeted message (e.g., targeted message #1) that indicates a neighbor change event and causes the NDS agent 105 to notify its neighboring nodes of the neighbor change event. In some embodiments, the NDS agent 105 notifies its neighboring nodes by broadcasting a first message (e.g., neighbor change message) indicative of the neighbor change event to each of its other neighboring nodes. In some embodiments, the NDS agent 105 notifies its neighboring nodes by transmitting a first message (e.g., neighbor change message) indicative of the neighbor change event to a second neighboring node (e.g., mesh node 104*d*), where the first message causes the second neighboring node to propagate the first message (e.g., propagated neighbor change message) to a third neighboring node (e.g., mesh node 104*f*) of the first mesh node.

The targeted message may prevent the NDS agent 105 from propagating the neighbor change event to mesh nodes 104 that are outside of a group of neighboring nodes. For example, the NDS agent 105*c* of mesh node 104*c* may receive a targeted message from the control mesh node 108, where the targeted message indicates that the control mesh node 108 selected the mesh node 104*b* as the target node.

The NDS agent 105*b* may determine that the group of neighboring nodes of mesh node 104*b* includes mesh nodes 104*a*, 104*d*, 104*f*, and then notify only these mesh nodes (e.g., mesh nodes 104*a*, 104*d*, 104*f*) about the neighbor change event. In some embodiments, the targeted message may instruct the NDS agent 105 to only notify the neighboring nodes that are within a predetermined number of hops (e.g., 1 hop, 2 hops, etc.) from the target node. For example, the NDS agent 105*c* of mesh node 104*c* may receive a targeted message from the control mesh node 108, where the targeted message indicates that the control mesh node 108 selected the mesh node 104*b* as the target node and that only 2-hop neighboring nodes should be notified about the neighbor change event. The NDS agent 105*b* may determine that the group of neighboring nodes that are within 2-hops of mesh node 104*b* includes mesh nodes 104*a*, 104*d*, 104*f* and mesh nodes 104*g*, 104*h*, 104*i*, and then notify only these mesh nodes (e.g., mesh nodes 104*a*, 104*d*, 104*f*, 104*g*, 104*h*, 104*i*) about the neighbor change event.

The mesh node 104 includes a network interface 206*a* configured to establish a communication session with a computing device for sending and receiving data over a communication network to the computing device. Accordingly, the network interface 206*a* includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the mesh node 104 includes a plurality of network interfaces 206*a* of different types, allowing for connections to a variety of networks, such as local area networks (public or private) or wide area networks including the Internet, via different sub-networks.

The mesh node 104 includes an input/output device 205*a* configured to receive user input from and provide information to a user. In this regard, the input/output device 205*a* is structured to exchange data, communications, instructions, etc. with an input/output component of the mesh node 104. Accordingly, input/output device 205*a* may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the mesh node 104, such as a built-in display, touch screen, microphone, etc., or external to the housing of the mesh node 104, such as a monitor connected to the mesh node 104, a speaker connected to the mesh node 104, etc., according to various embodiments. In some embodiments, the mesh node 104 includes communication circuitry for facilitating the exchange of data, values, messages, and the like between the input/output device 205*a* and the components of the mesh node 104. In some embodiments, the input/output device 205*a* includes machine-readable media for facilitating the exchange of information between the input/output device 205*a* and the components of the mesh node 104. In still another embodiment, the input/output device 205*a* includes any combination of hardware components (e.g., a touchscreen), communication circuitry, and machine-readable media.

The mesh node 104 includes a device identification component 207*a* (shown in FIG. 2A as device ID component 207*a*) configured to generate and/or manage a device identifier (sometimes referred to as, "mesh node ID") associated with the mesh node 104. The device identifier may include any type and form of identification used to distinguish the mesh node 104 from other computing devices. In some embodiments, to preserve privacy, the device identifier may be cryptographically generated, encrypted, or otherwise obfuscated by any device and/or component of mesh node 104. In some embodiments, the mesh node 104 may include the device identifier in any communication (e.g., neighbor reporting message, local neighbor request) that the mesh node 104 sends to a computing device.

The mesh node 104 includes a bus (not shown), such as an address/data bus or other communication mechanism for communicating information, which interconnects the devices and/or components of mesh node 104, such as processing device 202a, network interface 206a, input/output device 205a, and/or device ID component 207a.

In some embodiments, some or all of the devices and/or components of mesh node 104 may be implemented with the processing device 202a. For example, the mesh node 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

Figure 2B:
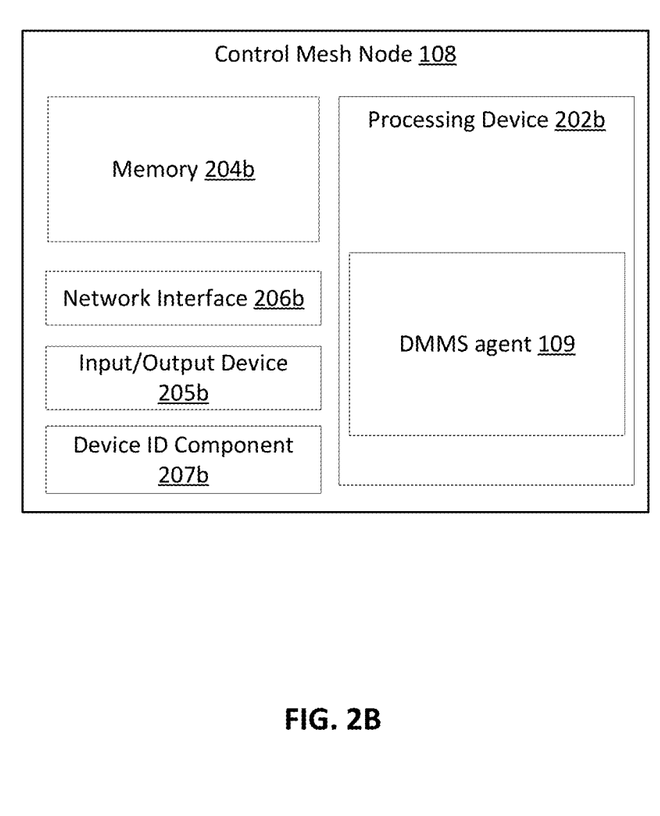
FIG. 2B is a block diagram depicting an example of the control mesh node 108 of the environment in FIG. 1, according to some embodiments.

FIG. 2B is a block diagram depicting an example of the control mesh node 108 of the environment in FIG. 1, according to some embodiments. While various devices, interfaces, and logic with particular functionality are shown, it should be understood that the control mesh node 108 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The control mesh node 108 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the control mesh node 108 instead of devices and/or components of the mesh node 104.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the control mesh node 108 instead of devices and/or components of the mesh node 104.

The processing device 202b may execute a dynamic mesh mapping service (DMMS) agent 109 that is configured to dynamically generate a network topology map that indicates based on the responses it receives from mesh nodes 104 about their attempts to discover their neighboring nodes. The network topology map indicates the one or more groups of neighboring nodes of the mesh network system 102 at a given point in time. The DMMS agent 109 maintains the network topology map in a storage (e.g., a database, memory 204a, etc.) and uses the network topology map for propagation control of neighbor reporting messages throughout the mesh network system 102.

The DMMS agent 109 may be configured to determine that a first mesh node (e.g., mesh node 104a) of the mesh network system 102 discovered a neighbor change event that is associated with a second mesh node (e.g., mesh node 104b). The DMMS agent 109 may make this determination based on a message that it receives a mesh node 104, where the message indicates that the first mesh node (e.g., mesh node 104a) discovered the neighbor change event associated with the second node (e.g., mesh node 104b).

The DMMS agent 109 may be configured to select one of the mesh nodes 104 of the mesh network system 102 as the "target node." For example, the DMMS agent 109 may select the first mesh node (e.g., mesh node 104a) as the "target node" because it discovered the neighbor change event, or the second mesh node (e.g., mesh node 104b) as the "target node" because it triggered the neighbor change event.

The DMMS agent 109 may be configured to identify, based on the network topology map, a group of neighboring nodes of the target node that are unaware of the neighbor change event associated with the second mesh node (e.g., mesh node 104b). For example, if the DMMS agent 109 selects the mesh node 104b as the target node (shown in FIG. 1 as, "target node #1"), then the group of neighboring nodes that are unaware of the neighbor change event would include mesh node 104c, mesh node 104d, and/or mesh node 104f. As another example, if the DMMS agent 109 selects the mesh node 104a as the target node, then the group of neighboring nodes that are unaware of the neighbor change event would include mesh node 104b, mesh node 104g, and/or mesh node 104g.

The DMMS agent 109 may be configured to determine a maximum hop count (e.g., 1-hop, 2-hop) based on a device type associated with the target node or a service provided by the target node, and use the maximum hop count to identify the group of neighboring nodes of the target node. For example, the DMMS agent 109 may determine that the mesh node 104b is a smartphone and that mesh node 104b is no longer a neighbor of the mesh node 104a. The DMMS agent 109 may determine that a smart phone is a non-critical device and/or provides a non-critical service, and in response, only identify the group of neighboring nodes of the target device that are within 1-hop of the target device. Therefore, if the DMMS agent 109 selects mesh node 104a as the target device, then the DMMS agent 109 would determine that the group of 1-hop neighboring nodes include mesh nodes 104b, 104g, 104h and control mesh node 108. Conversely, the DMMS agent 109 may determine that the mesh node 104b is an insulin pump and that mesh node 104b is no longer a neighbor of the mesh node 104a. The DMMS agent 109 may determine that an insulin pump is a critical device and/or provides a critical service, and in response, only identify the group of neighboring nodes of the target device that are within 2-hops of the target device. Therefore, if the DMMS agent 109 selects mesh node 104a as the target device, then the DMMS agent 109 would determine that the group of 2-hop neighboring nodes include mesh nodes 104b, 104c, 104d, 104f, 104g, 104h, 104i and control mesh node 108.

The DMMS agent 109 may be configured to transmit a targeted message to a first neighboring node (e.g., mesh node 104c) of the group of neighboring nodes to cause the first neighboring node to notify the group of neighboring nodes of the neighbor change event. In some embodiments, the targeted message may cause the first neighboring node to broadcast (e.g., fan-out), to other neighboring nodes of the group of neighboring nodes, a first message (e.g., neighbor change message) indicative of the neighbor change event. In some embodiments, the targeted message may cause the first neighboring node (e.g., mesh node 104c) to transmit, to a second neighboring node (e.g., mesh node 104d) of the group of neighboring nodes, a second message (e.g., neighbor change message) indicative of the neighbor change event to cause the second neighboring node to propagate the second message to a third neighboring node (e.g., mesh node 104f) of the group of neighboring nodes.

The DMMS agent 109 may be configured to identify, based on the network topology map, a group of nodes within a sub-region of a geographic region, where the mesh network system 102 is distributed over the geographic region.

The DMMS agent 109 may be configured to transmit a neighbor request to the group of nodes to cause each node of the group of nodes to transmit a local neighbor request to discover neighboring nodes. The DMMS agent 109 may be configured to receive a plurality of responses to the neighbor request, where each response identifies each of the neighboring nodes that replied to the local neighbor request. The DMMS agent 109 may be configured to infer, based on the plurality of responses, an existence of a "hidden" node (e.g., a third node) in the sub-region that did not reply to the local neighbor request. For example, the DMMS agent 109 may determine, based on the network topology map, that the sub-region includes a moving node that has a free movement exceeding a predetermined threshold value. As another example, the DMMS agent 109 may determine, based on the network topology map, that the sub-region includes a secured node that is associated with a security policy prohibiting the secured node from responding to the local neighbor request.

The DMMS agent 109 may be configured to redefine (e.g., mapping, redrawing), based on the plurality of responses, network edges of the sub-region to indicate the existence of the hidden node. The DMMS agent 109 may be configured to redefine update the network topology map based on the network edges responsive to redefining the network edges of the sub-region.

The control mesh node 108 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the control mesh node 108 instead of devices and/or components of the mesh node 104.

The control mesh node 108 includes an input/output device 205b configured to receive user input from and provide information to a user. In this regard, the input/output device 205b is structured to exchange data, communications, instructions, etc. with an input/output component of the control mesh node 108. The input/output device 205b includes identical or nearly identical functionality as input/output device 205a in FIG. 2A, but with respect to devices and/or components of the control mesh node 108 instead of devices and/or components of the mesh node 104.

The control mesh node 108 includes a device identification component 207b (shown in FIG. 2B as device ID component 207b) configured to generate and/or manage a device identifier associated with the control mesh node 108. The device ID component 207b includes identical or nearly identical functionality as device ID component 207a in FIG. 2A, but with respect to devices and/or components of the control mesh node 108 instead of devices and/or components of the mesh node 104.

The control mesh node 108 includes a bus (not shown), such as an address/data bus or other communication mechanism for communicating information, which interconnects the devices and/or components of the control mesh node 108, such as processing device 202b, network interface 206b, input/output device 205b, and/or device ID component 207b.

In some embodiments, some or all of the devices and/or components of control mesh node 108 may be implemented with the processing device 202b. For example, the control mesh node 108 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

Figure 2C:
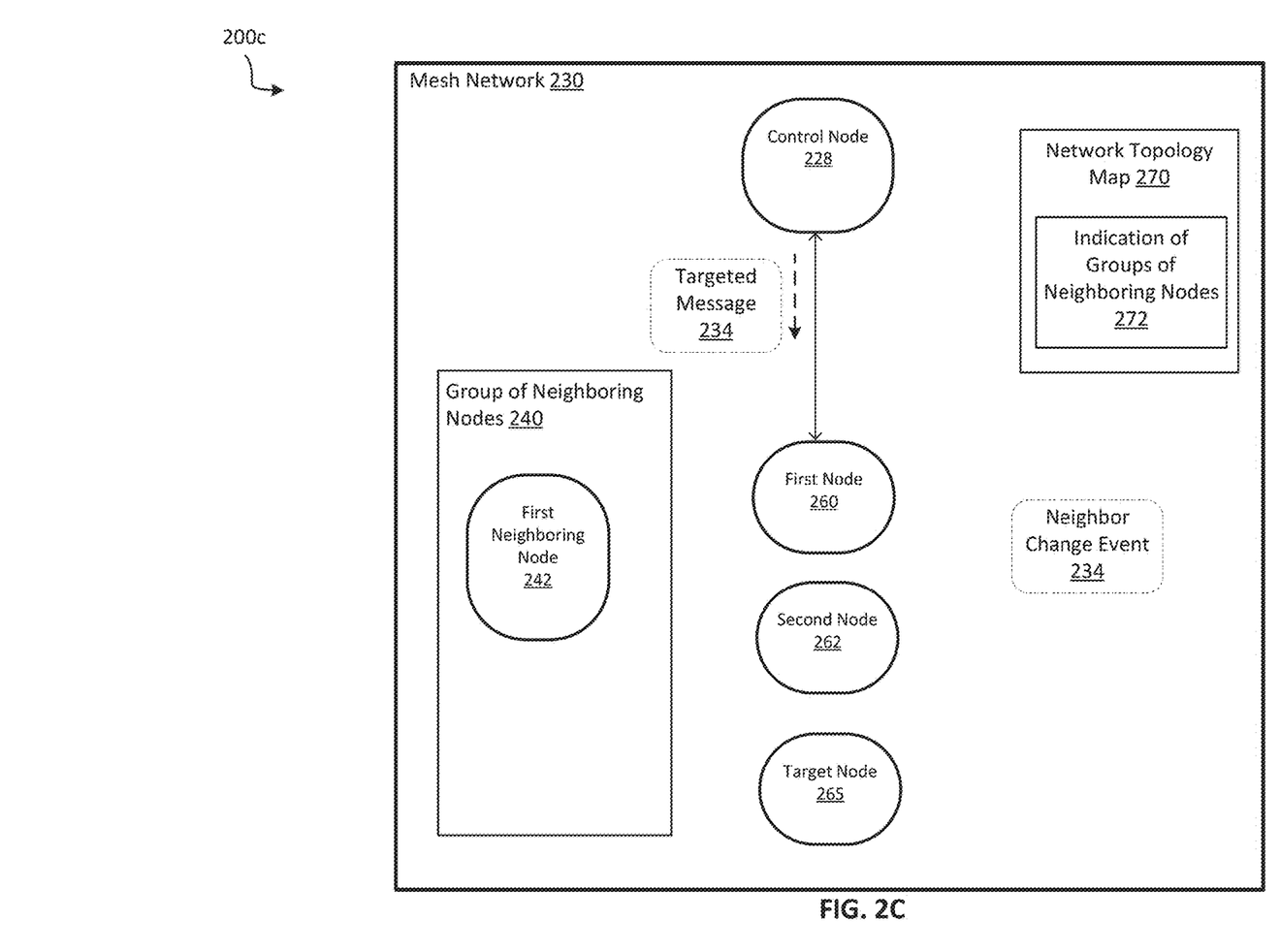
FIG. 2C is a block diagram depicting an example environment of a mesh network system 102, according to some embodiments.

FIG. 2C is a block diagram depicting an example environment of a mesh network system 102, according to some embodiments. The environment 200c includes a mesh network 230 (e.g., mesh network system 102 in FIG. 1). The mesh network 230 includes a control node 228 (e.g., control mesh node 108 in FIG. 1), a first node 260 (e.g., mesh node 104a in FIG. 1), a second node 262 (e.g., mesh node 104b in FIG. 1), a target node 265, a group of neighboring nodes 240, a network topology map 270, and a neighbor change event. The group of neighboring nodes 240 include a first neighboring node 242 (e.g., mesh node 104c in FIG. 1). The network topology map 270 includes an indication of groups of neighboring nodes 272.

The control node 228 maintains the network topology map 270, which includes an indication of the groups of neighboring nodes 272. The control node 228 determines that the first node 260 of the mesh network 230 discovered the neighbor change event 234 associated with the second node 262. The control node 228 identifies, based on the network topology map 270, the group of neighboring nodes 242 of the target node 265 of the mesh network 230 responsive to determining that the first node 260 detected the neighbor change event 234. The control node 228 transmits a targeted message to the first neighboring node 242 of the group of neighboring nodes 240 to cause the first neighboring node 242 to notify the group of neighboring nodes 240 of the neighbor change event 234.

Figure 3:
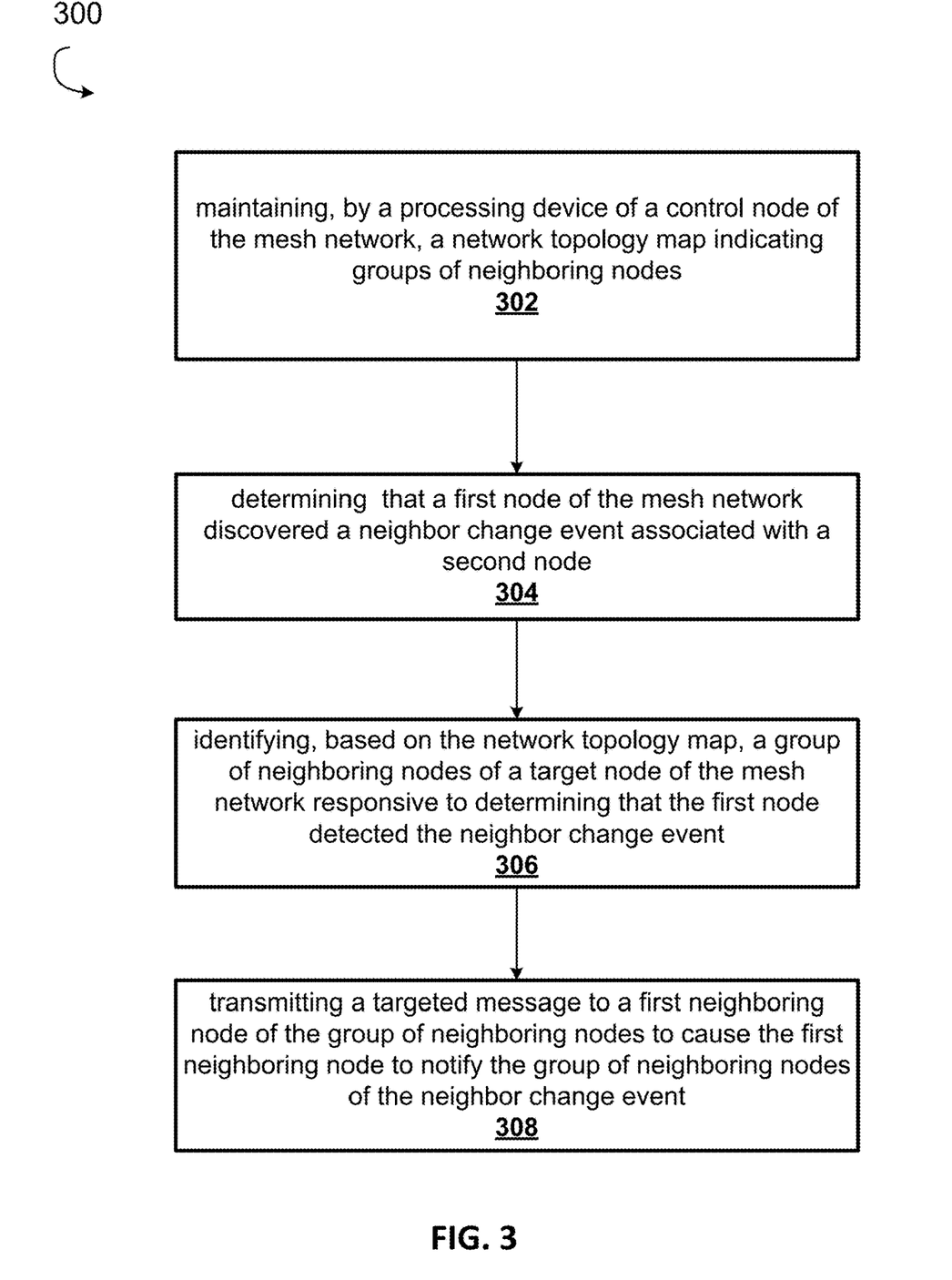
FIG. 3 is a flow diagram depicting a method of dynamically mapping a network topology of a mesh network of nodes, according to some embodiments.

FIG. 3 is a flow diagram depicting a method of dynamically mapping a network topology of a mesh network of nodes, according to some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 300 may be performed by a control mesh node, such as control mesh node 108 in FIG. 1. In some embodiments, method 300 may be performed by one or more mesh nodes, such as mesh nodes 104 in FIG. 1. In some embodiments, method 300 may be performed by a mesh network system, such as mesh network system 102 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of maintaining, by a processing device of a control node of the mesh network, a network topology map indicating groups of neighboring nodes. The method 300 includes the block 304 of determining that a first node of the mesh network discovered a neighbor change event associated with a second node. The method 300 includes the block 306 of identifying, based on the network topology map, a group of neighboring nodes of a target node of the mesh network responsive to determining that the first node detected the neighbor change event. The method 300 includes the block 308 of transmitting a targeted message to a first neighboring node of the group of neighboring nodes to cause the first neighboring node to notify the group of neighboring nodes of the neighbor change event.

Figure 4:
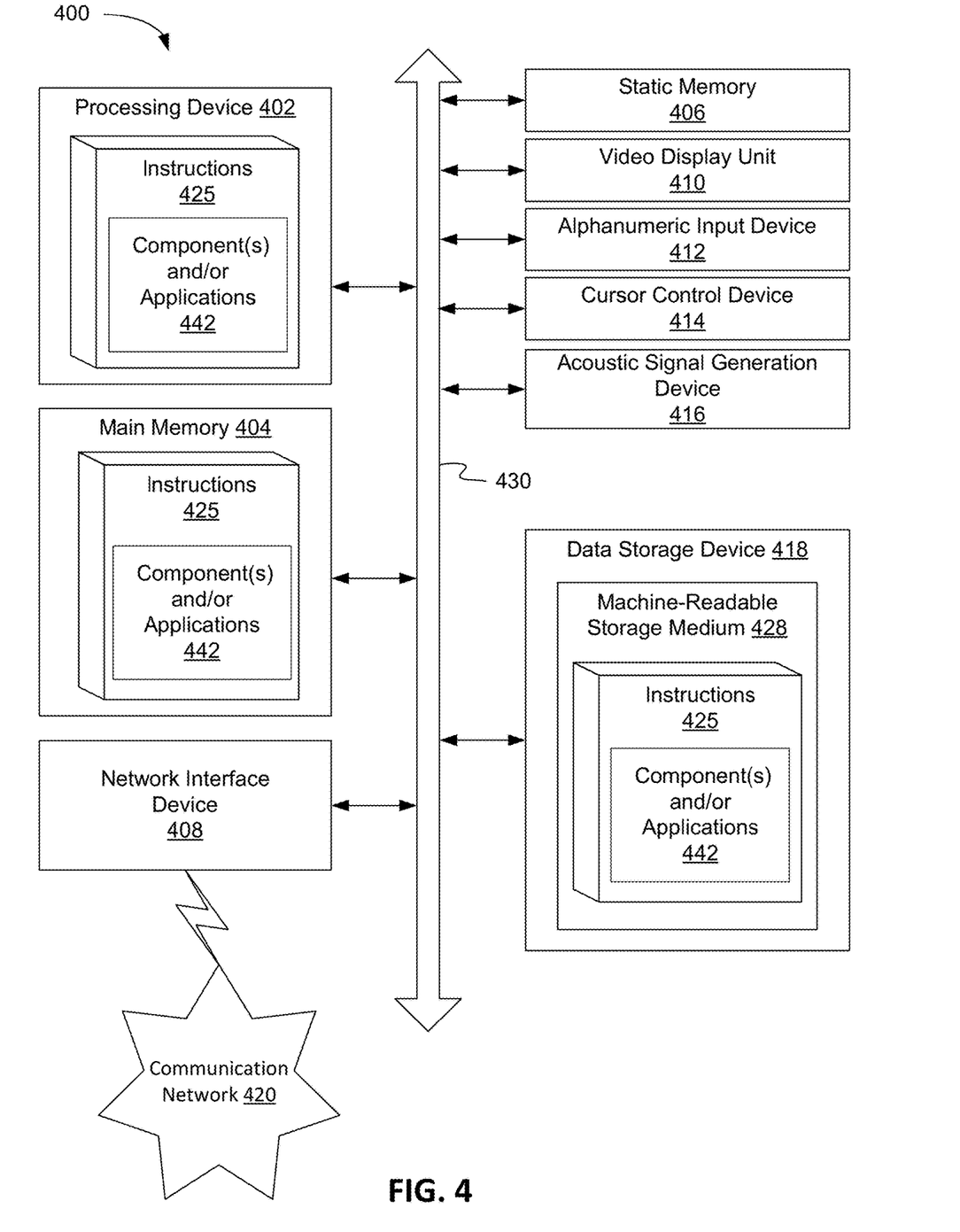
FIG. 4 is a block diagram of an example computing device that may perform one or more of the operations described herein, in accordance with some embodiments.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components, agents, and/or applications 442 (e.g., NDS agent 105 in FIG. 2A, DMMS agent 109 in FIG. 2B) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "maintaining," "determining," "identifying," "transmitting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method of dynamically mapping a network topology of a mesh network of nodes, the method comprising:
   maintaining, by a processing device of a control node of the mesh network, a network topology map indicating groups of neighboring nodes;
   determining that a first node of the mesh network discovered a neighbor change event associated with a second node;
   identifying, based on the network topology map, a group of neighboring nodes of a target node of the mesh network responsive to determining that the first node detected the neighbor change event; and
   transmitting a targeted message to a first neighboring node of the group of neighboring nodes of the target node of the mesh network to cause the first neighboring node to notify the group of neighboring nodes of the neighbor change event.

2. The method of claim 1, further comprising:
   receiving a message indicating that the first node of the mesh network discovered the neighbor change event associated with the second node.

3. The method of claim 1, wherein the targeted message prevents the group of neighboring nodes from propagating the neighbor change event to nodes that are outside of the group of neighboring nodes.

4. The method of claim 3, further comprising:
   determining a maximum hop count based on a device type associated with the second node or a service provided by the second node; and
   determining that each neighboring node of the group of neighboring nodes is within the maximum hop count from the target node.

5. The method of claim 1, wherein the targeted message further causes the first neighboring node to either: (a) broadcast, to other neighboring nodes of the group of neighboring nodes, a first message indicative of the neighbor change event, or (b) transmit, to a second neighboring node of the group of neighboring nodes, a second message indicative of the neighbor change event to cause the second neighboring node to redirect the second message to a third neighboring node of the group of neighboring nodes.

6. The method of claim 1, wherein the target node is the first node or the second node.

7. The method of claim 1, further comprising:
   determining that each neighboring node of the group of neighboring nodes of the target node is unaware of the neighbor change event associated with the second node.

8. The method of claim 1, wherein the neighbor change event associated with the second node comprises the second node changing from being a neighbor of the first node to being a non-neighbor of the first node, the second node changing from being the non-neighbor of the first node to being the neighbor of the first node, or the second node changing from being responsive to communication from the first node to being non-responsive to the communication from the first node.

9. The method of claim 1, wherein the mesh network is distributed over a geographic region, and further comprising:
identifying, based on the network topology map, a group of nodes within a sub-region of the geographic region;
transmitting a neighbor request to the group of nodes to cause each node of the group of nodes to transmit a local neighbor request to discover neighboring nodes;
receiving a plurality of responses to the neighbor request, each response identifying each of the neighboring nodes that replied to the local neighbor request; and
inferring, based on the plurality of responses, an existence of a third node in the sub-region that did not reply to the local neighbor request.

10. The method of claim 9, further comprising:
redefining, based on the plurality of responses, network edges of the sub-region to indicate the existence of the third node; and
updating the network topology map based on the network edges responsive to redefining the network edges of the sub-region.

11. The method of claim 9, further comprising:
determining, based on the network topology map, that the sub-region comprises a moving node having a free movement exceeding a predetermined threshold value, or
determining, based on the network topology map, that the sub-region comprises a secured node that is associated with a security policy prohibiting the secured node from responding to the local neighbor request.

12. A mesh network system, comprising:
a plurality of computing devices, wherein each computing device corresponds to a respective node of a plurality of nodes of the mesh network system, each computing device comprises a processing device, wherein one of the plurality of computing devices is a control node, wherein the processing device of the control node of the plurality of nodes to:
maintain a network topology map indicating groups of neighboring nodes;
determine that a first node of the mesh network discovered a neighbor change event associated with a second node;
identify, based on the network topology map, a group of neighboring nodes of a target node of the mesh network responsive to determining that the first node detected the neighbor change event; and
transmit a targeted message to a first neighboring node of the group of neighboring nodes of the target node of the mesh network to cause the first neighboring node to notify the group of neighboring nodes of the neighbor change event.

13. The mesh network system of claim 12, wherein the targeted message prevents the group of neighboring nodes from propagating the neighbor change event to nodes that are outside of the group of neighboring nodes.

14. The mesh network system of claim 13, wherein the processing device of the control node to:
determine a maximum hop count based on a device type associated with the second node or a service provided by the second node; and
determine that each neighboring node of the group of neighboring nodes is within the maximum hop count from the target node.

15. The mesh network system of claim 12, wherein the target node is the first node or the second node.

16. The mesh network system of claim 12, wherein the processing device of the control node to:
determine that each neighboring node of the group of neighboring nodes of the target node is unaware of the neighbor change event associated with the second node.

17. The mesh network system of claim 12, wherein the neighbor change event associated with the second node comprises the second node changing from being a neighbor of the first node to being a non-neighbor of the first node, the second node changing from being the non-neighbor of the first node to being the neighbor of the first node, or the second node changing from being responsive to communication from the first node to being non-responsive to the communication from the first node.

18. The mesh network system of claim 12, wherein the mesh network is distributed over a geographic region, and wherein the processing device of the control node to:
identify, based on the network topology map, a group of nodes within a sub-region of the geographic region;
transmit a neighbor request to the group of nodes to cause each node of the group of nodes to transmit a local neighbor request to discover neighboring nodes;
receive a plurality of responses to the neighbor request, each response identifying each of the neighboring nodes that replied to the local neighbor request; and
infer, based on the plurality of responses, an existence of a third node in the sub-region that did not reply to the local neighbor request.

19. The mesh network system of claim 18, wherein the processing device of the control node to:
redefine, based on the plurality of responses, network edges of the sub-region to indicate the existence of the third node; and
update the network topology map based on the network edges responsive to redefining the network edges of the sub-region.

20. A non-transitory computer-readable medium storing instructions that, when executed by a processing device of a control node of a mesh network, cause the processing device to:
maintain a network topology map indicating groups of neighboring nodes;
determine that a first node of the mesh network discovered a neighbor change event associated with a second node;
identify, based on the network topology map, a group of neighboring nodes of a target node of the mesh network responsive to determining that the first node detected the neighbor change event; and
transmit a targeted message to a first neighboring node of the group of neighboring nodes of the target node of the mesh network to cause the first neighboring node to notify the group of neighboring nodes of the neighbor change event.

* * * * *